(12) United States Patent
Netzer et al.

(10) Patent No.: US 11,784,558 B2
(45) Date of Patent: Oct. 10, 2023

(54) LLC STAGE FOR LED DRIVERS

(71) Applicant: TRIDONIC GMBH & CO KG, Dornbirn (AT)

(72) Inventors: Harald Netzer, Nenzing (AT); Stefan Stark, Muntlix (AT)

(73) Assignee: Tridonic GmbH & Co KG, Dornbirn (AT)

( * ) Notice: Subject to any disclaimer, the term of this patent is extended or adjusted under 35 U.S.C. 154(b) by 124 days.

(21) Appl. No.: 17/435,739

(22) PCT Filed: Apr. 1, 2020

(86) PCT No.: PCT/EP2020/059306
§ 371 (c)(1),
(2) Date: Sep. 2, 2021

(87) PCT Pub. No.: WO2020/201382
PCT Pub. Date: Oct. 8, 2020

(65) Prior Publication Data
US 2022/0141933 A1 May 5, 2022

(30) Foreign Application Priority Data
Apr. 4, 2019 (EP) .................................... 19167223

(51) Int. Cl.
*H02M 1/38* (2007.01)
*H05B 45/3725* (2020.01)
(Continued)

(52) U.S. Cl.
CPC .......... *H02M 1/38* (2013.01); *H05B 45/3725* (2020.01); *H02M 3/01* (2021.05); *H02M 3/33571* (2021.05); *H02M 3/33573* (2021.05)

(58) Field of Classification Search
CPC .. H05B 45/3725; H05B 45/35; H05B 45/345; H05B 45/382; H05B 45/46; Y02B 20/30; Y02B 70/10; H02M 3/3376; H02M 3/158
See application file for complete search history.

(56) References Cited

U.S. PATENT DOCUMENTS 6,381,160 B1 * 4/2002 Sauerlander ........ H02M 3/3376
363/124
9,537,383 B1 1/2017 Wibben
(Continued)

OTHER PUBLICATIONS

International Search Report and Written Opinion dated Jun. 15, 2020 issued in priority PCT Application PCT/EP2020/059306.

*Primary Examiner* — Abdullah A Riyami
*Assistant Examiner* — Syed M Kaiser
(74) *Attorney, Agent, or Firm* — Andrus Intellectual Property Law, LLP

(57) ABSTRACT

The invention relates to an LLC stage for an LED driver (100), comprising a half bridge or full-bridge circuit (100*a*) comprising two switches (M40, M41), connected in series, a control circuitry (100*e*), such as e.g. a microcontroller or ASIC, for controlling switching operations of the switches (M40, M41), wherein the control circuitry (100*e*) for switches is arranged to monitor the middle point voltage between the two switches (M40, M41) and enables the switch on of one of the switches (M40, M41) only if the middle point voltage meets defined criteria. The control circuitry (100*e*) is designed to issue an error signal, if a dead time, during which both switches are non-conducting and resulting from the monitoring of the midpoint voltage, is greater than a preset threshold value.

13 Claims, 3 Drawing Sheets

(51) Int. Cl.
*H02M 3/00* (2006.01)
*H02M 3/335* (2006.01)

(56) References Cited

U.S. PATENT DOCUMENTS

| | | | |
|---|---|---|---|
| 10,116,199 B1 | 10/2018 | Halberstadt | |
| 2008/0129269 A1* | 6/2008 | Rozsypal | H02M 3/3376 323/288 |
| 2010/0084918 A1* | 4/2010 | Fells | G01V 3/10 307/32 |
| 2017/0019960 A1* | 1/2017 | Qu | H05B 45/3725 |

* cited by examiner

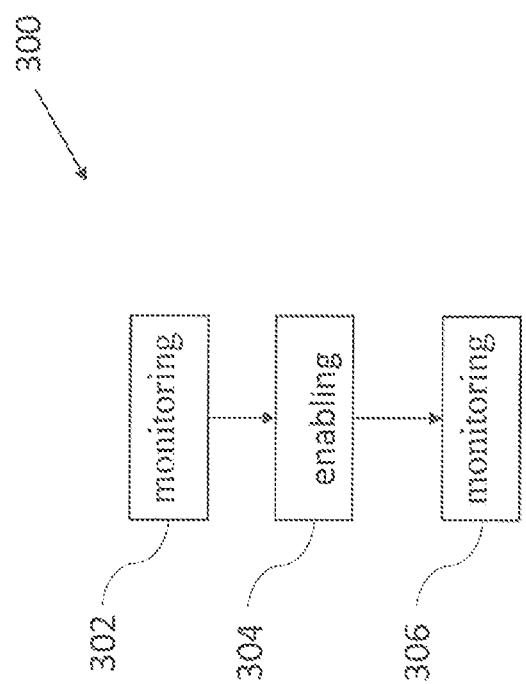

LLC STAGE FOR LED DRIVERS

CROSS REFERENCE TO RELATED APPLICATIONS

The present application is the U.S. national stage application of international application PCT/EP2020/059306 filed Apr. 1, 2020, which international application was published on Oct. 8, 2020 as International Publication WO 2020/201382 A1. The international application claims priority to European Patent Application 19167223.7 filed Apr. 4, 2019.

TECHNICAL FIELD OF THE INVENTION

The invention relates to a resonant converter stage, preferably LLC stage, for LED drivers. The invention further relates to a method for a resonant converter stage, preferably LLC stage, for LED drivers.

BACKGROUND OF THE INVENTION

The use of resonant converter, preferably LLC, stages in LED gears are known, e.g. in the context of a two stage topology (boost power factor correction (PFC) and half-bridge (HB) LLC) or a three stage topology (boost PFC, half-bridge LLC and buck). In the first case, the HB-LLC stage acts as a current source that directly supplies the LED load. In the second case, the HB-LLC stage supplies a third (buck) stage with a constant voltage.

In order to ensure as so-called zero voltage switching of the 2 switches of a half-bridge DC/AC converter (that means the switches are switched ON only when the voltage across drain-source is low) a known mechanism called CCD (capacitive current detection) circuitry is implemented. The CCD circuitry monitors the HB middle point voltage, wherein the high side FET is only allowed to switch ON when the middle point voltage is above a certain threshold (e.g. above 50% level), and the low side FET is only allowed to switch ON when the middle point voltage is below a certain threshold (e.g. below 50% level). This typically leads to the presence of a dead-time, e.g. a period in which neither of the two switches is switched on (i.e. conducting).

This CCD circuitry ensures that the switching losses of the FETs are low and FET destruction is avoided. Nevertheless, a problem occurs if the half-bridge input voltage (DC bus voltage supplied e.g. by a PFC stage) drops e.g. because of a mains voltage interruption. If this voltage drop is not detected (and handled) early enough, the half-bridge controller will attempt to compensate for the decreasing DC supply voltage and the resulting decrease of the LED current by altering the switching of the switches, typically by lowering the switching frequency towards the resonance frequency of the LLC.

Depending on the time response of the control circuitry for the constant control of the LED current, it can thus take some time before this undesired operation state is detected, i.e. until the switch frequency of the switches reaches a set lower frequency limit.

Thus, it is an objective to provide an improved LLC stage for LED drivers. Especially the time period for detecting this undesired LLC operation state, caused by drops of the AC mains supply, shall be reduced.

SUMMARY OF THE INVENTION

According to a first aspect of the invention, an LLC stage for an LED driver is provided.

The resonant converter stage, preferably LLC stage, for an LED driver comprises a half bridge or full-bridge circuit comprising two switches, connected in series, a control circuitry, such as e.g. a microcontroller or ASIC, for controlling switching operations of the switches, wherein the control circuitry for switches is arranged to monitor the middle point voltage between the two switches and enables the switch on of one of the switches only if the middle point voltage meets defined criteria. The control circuitry is designed to issue an error signal, if a dead time, during which both switches are non-conducting and resulting from awaiting that the midpoint voltage meets the switch-on criterion, is greater than a preset threshold value.

In a preferred embodiment, the error signal causes at least one of: the stop of the switching operation of the switches, the restart of the resonant converter stage, preferably LLC stage, especially restart of a microcontroller-based control circuitry, and the storing of an error flag in a storing unit associated with the control circuitry.

In a further preferred embodiment, the error signal is only issued if the occurrence of the dead time exceeding said preset threshold value meets at least one given criterion going beyond an individual occurrence.

In a further preferred embodiment, the given criterion is at least the frequency of the occurrence of the dead time exceeding said preset threshold value, the frequency being calculated on a time basis or the basis of switching cycles of the two switches.

In a further preferred embodiment, the control circuitry controls the frequency and/or the duty cycle of the switching operations of said switches depending on a feedback signal, preferably being representative of the LED current.

In a further preferred embodiment, the control circuitry for switches is configured to switch on one of the switches if the middle point voltage is higher than a first threshold value and to switch on the other switch when the middle point voltage is lower than the first threshold value.

In a further preferred embodiment, the threshold value is a fixed value.

In a further preferred embodiment, the threshold value is a dynamic value.

In a further preferred embodiment, the threshold value depends on a duty cycle of the switches.

In a further preferred embodiment, the threshold value is a function of an effective period of switching on of the two switches.

In a further preferred embodiment, the threshold value is a function of an effective period of switching on of one of the two switches.

According to a second aspect of the invention, an LED driver comprising a LLC stage according to the first aspect and the embodiments thereof, and comprising output terminals for supplying an LED load is provided.

According to a third aspect of the invention, a method for controlling two switches of an LLC stage is provided comprising a control circuitry for switches, comprising the steps of: monitoring a middle point voltage between the two switches; enabling the switch on of one of the switches only after a dead time, if the middle point voltage meets defined criteria; monitoring the dead time resulting from the monitoring of the middle point voltage; and issuing an error signal, if the dead time is greater than a threshold value.

BRIEF DESCRIPTION OF THE DRAWINGS

FIG. 3 shows a method for controlling two switches of an LLC stage for an LED driver.

Figure 1:
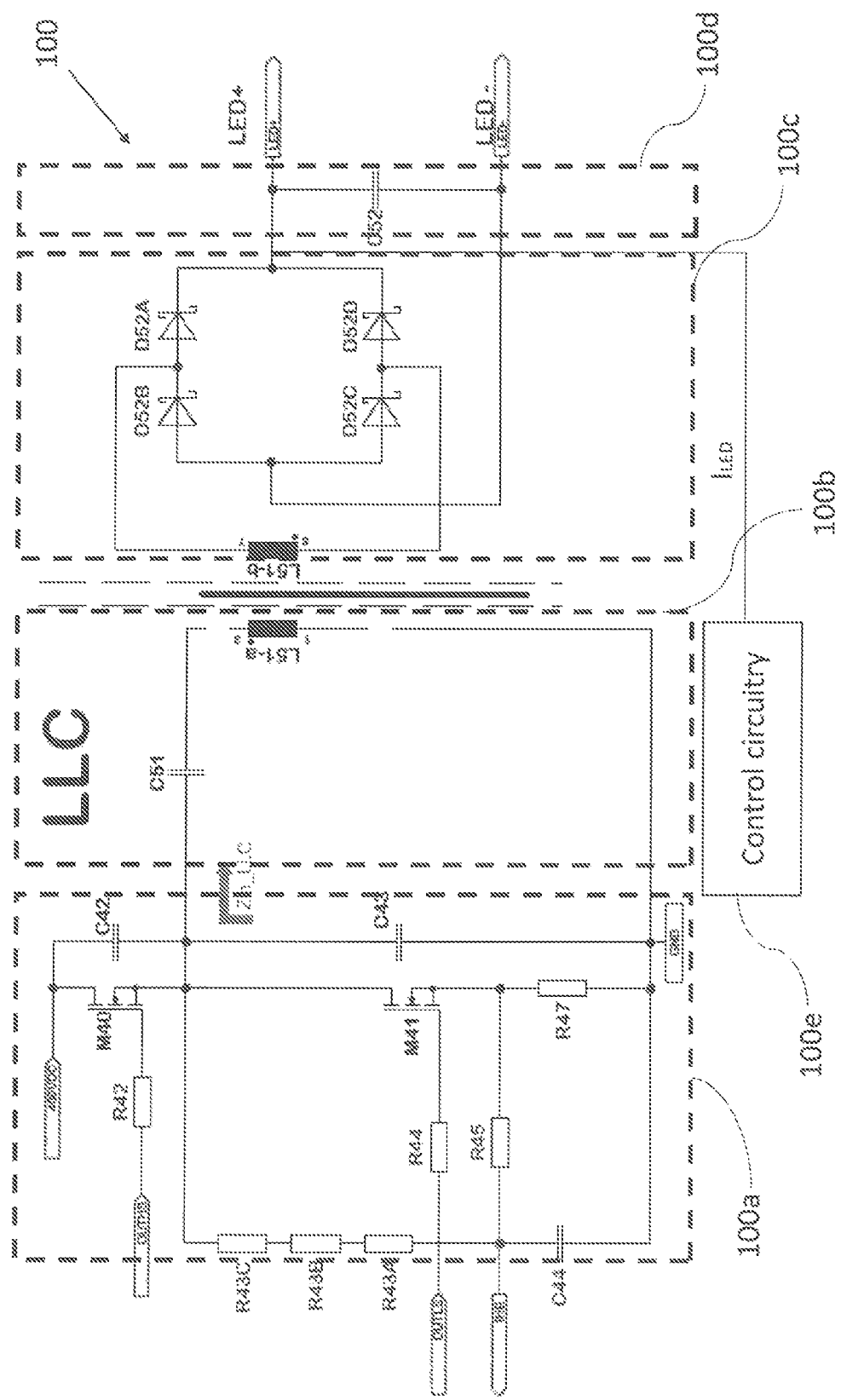
FIG. 1 shows an embodiment of an LLC stage for an LED driver according to the invention.

DETAILED DESCRIPTION OF THE
PREFERRED EMBODIMENTS

Aspects of the present invention are described herein in the context of LED drivers.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of an resonant converter stage, preferably LLC stage, for an LED driver will be presented. However, as those skilled in the art will readily appreciate, these aspects may be extended to aspects of resonant converter stage, preferably LLC stage, for an LED driver without departing from the invention.

LED drivers are well-known in the art, and therefore, will only briefly be discussed to provide a complete description of the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Now referring to FIG. 1 an embodiment of an LLC stage for an LED driver 100 according to the invention is shown. The resonant converter stage could be alternatively formed by a LCC stage or another type of resonant converter stage as well.

In this embodiment, the LLC stage comprises a switching bridge 100a, an LLC tank 100b, a transformer and rectifier 100c, an output capacitor 100d and a control circuitry 100e.

The switching bridge 100a generates a square waveform to excite the LLC resonant tank 100b, which will output a resonant sinusoidal current that gets scaled and rectified by the transformer and rectifier circuit 100c. The output capacitor 100d filters the rectified AC current and outputs a DC voltage.

The switching bridge 100a comprises two serially connected switches (FETs) M40 and M41. The half-bridge arrangement M40, M41 is fed with a DC voltage. The mid-point of the switches M40, M41 is connected to a resonance capacitor C51 and the primary side winding L51a of the transformer of the LLC. The primary side winding L51a of the transformer of the LLC is coupled with a secondary side winding L51b connected to a rectifying diode arrangement D52A, D52B, D52C and D52D.

The output of the diode arrangement is fed to a capacitor C52, the DC voltage of which is applied to output terminals LED+ and LED− for supplying an LED load.

Furthermore, seven resistors R42, R43A, R43B, R43C, R44, R45 and R47, and three capacitors C42, C43, and C44 are provided in the switching half-bridge 100a.

Moreover, the output of the diode arrangement is fed to the control circuitry 100e.

The switching bridge 100a can be a half bridge, as in the embodiment shown is FIG. 1, or full-bridge. The control circuitry 100e, such as e.g. a microcontroller or ASIC, is configured to control switching operations of the switches M40, M41. The control circuitry 100e is arranged to monitor the middle point voltage between the two switches M40, M41 and enables the switch on of one of the switches M40, M41 only if the middle point voltage meets defined criteria for a safe and energy-saving switching.

Moreover, the control circuitry 100e is designed to issue an error signal, if a dead time, during which both switches M40, M41 are non-conducting and resulting from the monitoring of the midpoint voltage, is greater than a preset threshold value.

In an embodiment, the dead time in the HB-LLC stages can consist of two parts: a fixed part that is there (e.g. 700 ns) and a variable part that is added by the CCD functionality (if necessary). So, for example, if M40 switches OFF, the control circuitry waits for 700 ns, and then switches ON M41, if the middle point voltage fulfills the CCD condition (in this case if the middle point voltage is below e.g. 50%). If the middle point voltage is not below this level, the CCD functionality increases the dead time (this is then the variable, or dynamic, part of the dead time).

If an error signal occurs, then one of the following situations happens:

the stop of the switching operation of the switches M40, M41;

the restart of the LLC stage for LED driver 100, especially restart of the microcontroller-based control circuitry 100e, the sending off of an error signal over a wireless or wirebound (e.g. bus) transmission channel, or the storing of an error flag in a storing unit associated with the control circuitry 100e.

The error signal preferably is only issued if the occurrence of the dead time exceeding the preset threshold value meets at least one given criterion going beyond an individual occurrence. The given criterion is at least the frequency of the occurrence of the dead time exceeding the preset threshold value. The frequency can be calculated on a time basis or the basis of switching cycles of the two switches M40 and M41.

Moreover, the control circuitry 100e controls the frequency and/or the duty cycle of the switching operations of the switches M40, M41 depending on a feedback signal, preferably being representative of the LED current. Furthermore, the control circuitry 100e can be configured to switch on one of the switches M40 if the middle point voltage is higher than a first threshold value and to switch on the other switch M41 when the middle point voltage is lower than the first threshold value. In particular, the threshold value can be a fixed value or a dynamic value. Moreover, the threshold value depends on a duty cycle of the switches M40 and M41. The threshold value can also be a function of an effective period of switching on of the two switches M40, M41 or a function of an effective period of switching on of one of the two switches M41, for example.

Using the dead time monitoring has the advantage that the undesired operation state of the LLC is detected faster than in the prior art. This monitoring can be done (switching) cycle-by-cycle. This has the advantage that error signals can be detected faster. In fact, the occurrence of too long dead times shall be detected by the control circuitry 100e and signalled by an error flag. The control circuitry 100e then can either perform a reset (or error shutdown) on its own, or the microcontroller simply polls this error flag and reacts with a reset (or shutdown) in case the flag is set.

In an embodiment, the real dead time of the control circuitry is not known. Only the nominal dead times (that can be set individually for the high side FET M40 and the low side FET M41) are known. Due to the CCD function this nominal dead times may be increased if the monitored half-bridge middle point voltage is not above (for high side FET M40 turn on) or below (for low side FET M41 turn on) the threshold value. Therefore, the real dead time needs to be measured within the control circuitry. This real dead time can then be compared either to a fixed maximum limit (e.g. tdead_HS_max for high side FET M40, tdead_LS_max for low side FET M41), or to a dynamic limit (e.g. tdead_HS_max=Tout/2, tdead_LS_max=Tout/2, wherein Tout is the target half-bridge period time). Once the real dead time is longer than the limit, a tdead_max event is detected.

In order to ensure a robust design, the error flag (or error shutdown) may not be set on the first tdead_max event but only when several of these events occur within a specific time. Therefore, an event counter (or a low frequency filter unit) can be utilized. The problem with the increased dead time does not necessarily occur in consecutive half-bridge periods. It can be that one period is without errors (nominal or only slightly increased tdead) and the problem occurs only at every other period. Therefore, a reset event counter, which requires e.g. that the event is set for 8 consecutive half-bridge periods, cannot be used: an up/down event counter with weighted counting is proposed.

This up/down event counter is initialized to e.g. a maximum value of 64. Then, every tdead_max event decreases the event counter by 4 and every correct tdead increases the event counter by 1. Once the event counter reaches 0, the tdead_max error flag is set (or the error shutdown is performed). With this approach it can be ensured that the described problem is also detected in cases where these long tdeads occur only every other or every third half-bridge period. Instead of the values 4 and 1 also other values can be used.

Figure 2:
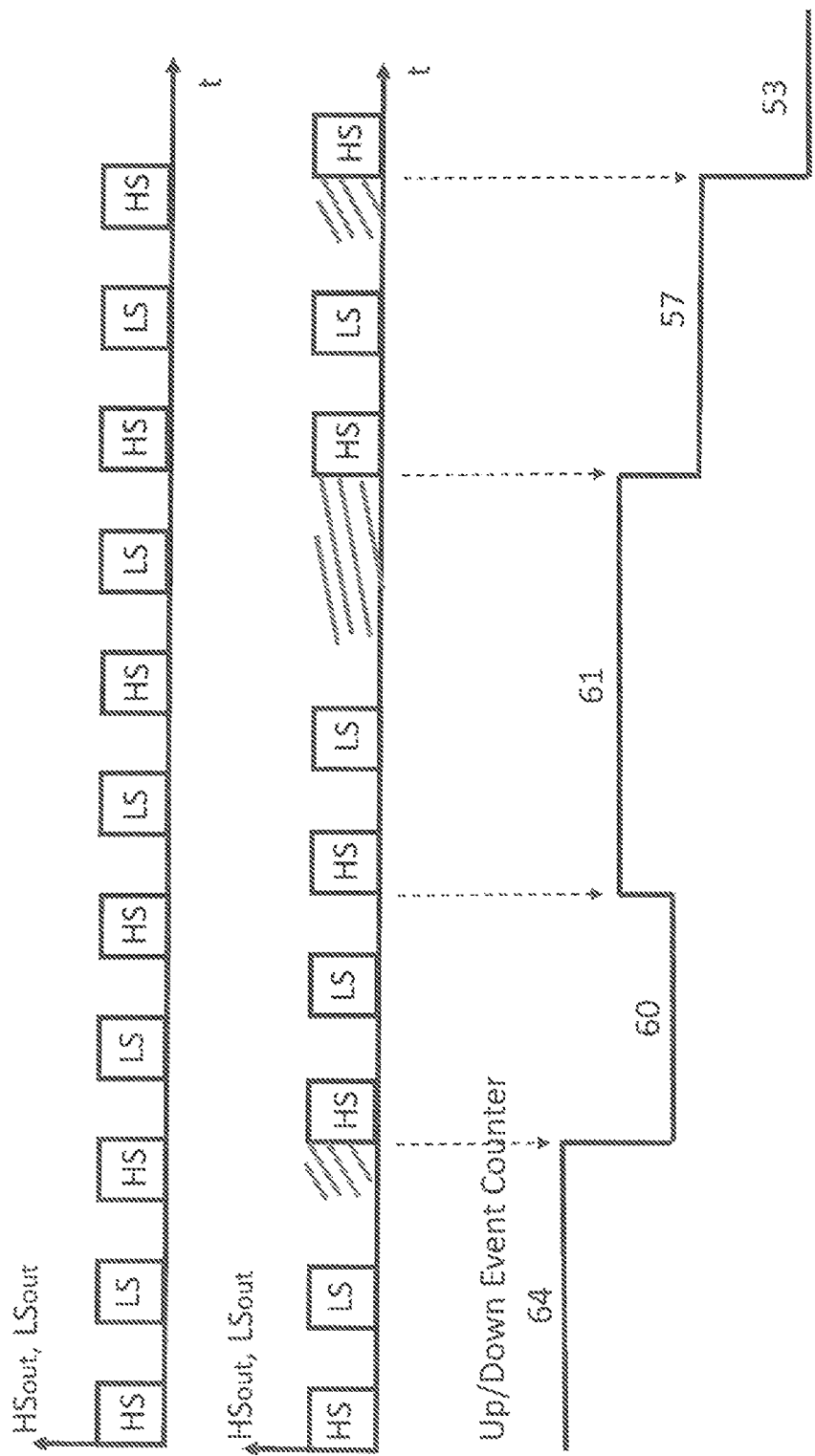
FIG. 2 shows an up/down event counter for an LLC stage for an LED driver according to the invention.

FIG. 2 shows an example of the dead time detection. The increased dead times are highlighted with oblique lines. Every increased dead time decreases the event counter by 4, every nominal dead time increased the event counter by 1. Once the event counter reaches 0 (not shown in FIG. 2) the error flag is set. The example in FIG. 2 shows how the dead time for the high side FET M40 (tdead_HS) is monitored. Additionally, such a detection mechanism would be implemented for the low side FET M41, to monitor the dead time before the low side FET M41 is switched ON (tdead_LS).

The problem is that the half-bridge input voltage (e.g. 400V input voltage for the half-bridge, supplied by a boost PFC which is arranged as power factor correction stage supplying the half-bridge) drops due to e.g. a AC mains voltage interruption. With a CCD function according to the prior art (i.e. monitoring of the center voltage before the two switches are switched on would lead to an extension of the dead time depending on the level of the center voltage) the dead times between the two switch control signals would be too long.

With the present invention such a wrong state can be detected quickly. According to the present invention it will be possible to detect the occurrence of such a switching state (the wrongly extended dead times) by means of the up/down event counter.

FIG. 3 shows a method 300 for controlling two switches of an LLC stage for an LED driver.

The method 300 for controlling two switches of an LLC stage comprising a control circuitry for switches, comprises the steps of:

monitoring 302 a middle point voltage between the two switches;

enabling 304 the switch on of one of the switches only after a dead time, if the middle point voltage meets defined criteria, and monitoring 306 the dead time resulting from the monitoring of the middle point voltage; and issuing an error signal, if the dead time is greater than a threshold value.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

REFERENCE SIGNS

100 LLC stage
100a switching bridge
100b LLC tank
100dc transformer and rectifier
100e control circuitry
300 method
302 step
304 step
306 step

What is claimed is:

1. A resonant converter stage for an LED driver (100), comprising:
    a half bridge or full-bridge circuit (100a) comprising two switches (M40, M41), connected in series;
    a control circuitry (100e) for controlling switching operations of the switches (M40, M41);
    wherein the control circuitry (100e) for controlling switching operations is arranged to monitor a middle point voltage between the two switches (M40, M41)

and enables the switch on of one of the switches (M40, M41) only if the middle point voltage meets defined criteria;

and further wherein:

the control circuitry (100e) is designed to issue an error signal, if a dead time, during which both switches are non-conducting and resulting from the monitoring of the middle point voltage, is greater than a preset threshold value, the error signal is only issued if the occurrence of the dead time exceeding said preset threshold value meets at least one given criterion going beyond an individual occurrence.

2. The resonant converter stage for an LED driver (100); of claim 1 wherein the errors signal causes at least one of:

the stop of the switching operation of the switches (M40, M41);

the restart of the resonant converter stagebased control circuitry (100e);

the sending off of the error signal over a wireless or wirebound transmission channel; and the storing of an error flag in a storing unit associated with the control circuitry.

3. The resonant converter stage of claim 1:

wherein the given criterion is at least the frequency of the occurrence of the dead time exceeding said preset threshold value, the frequency being calculated on a time basis or the basis of switching cycles of the two switches (M40, M41).

4. The resonant converter stage of claim 1 wherein the control circuitry (100e) controls the frequency and/or the duty cycle of the switching operations of said switches (M40, M41) depending on a feedback signal representative of the LED current.

5. The resonant converter stage of claim 1 wherein the control circuitry (100e) for switches is configured to switch on one of the switches (M40, M41) if the middle point voltage is higher than a first threshold value and to switch on the other switch when the middle point voltage is lower than the first threshold value.

6. The resonant converter stage of claim 1 wherein the threshold value is a fixed value.

7. The resonant converter stage of claim 1 wherein the threshold value is a dynamic value.

8. The resonant converter stage of claim 6 wherein the threshold value depends on a duty cycle of the switches (M40, M41).

9. The resonant converter stage of claim 7, wherein the threshold value is a function of an effective period of switching on of the two switches (M40, M41).

10. The resonant converter stage of claim 7, wherein the threshold value is a function of an effective period of switching on of one of the two switches (M40, M41).

11. An LED driver comprising the resonant converter stage (100) according to claim 1, and comprising output terminals for supplying an LED load.

12. The resonant converter stage of claim 1 wherein the resonant converter stage is an LLC stage.

13. A method (300) for controlling two switches (M40, M41) of a resonant LLC converter stage (100) comprising a control circuitry for switches (100e) connected in series and being part of a half bridge or full bridge converter, comprising the steps of:

monitoring (302) a middle point voltage between the two switches (M40, M41);

enabling (304) the switch on of one of the switches only after a dead time, if the middle point voltage meets defined criteria;

monitoring (306) the dead time resulting from the monitoring of the middle point voltage; and issuing an error signal, if the dead time is greater than a preset threshold value, where the error signal is only issued if the occurrence of the dead time exceeding said preset threshold value meets at least one given criterion going beyond an individual occurrence.

* * * * *